United States Patent [19]

Nefedova et al.

[11] 3,984,358

[45] Oct. 5, 1976

[54] GRANULATED ION EXCHANGERS CONSISTING OF POLYSTYRENE EXCHANGERS WITH VINYLIDENE FLUORIDE COPOLYMER OR POLYTHENE-POLYVINYL ALCOHOL MIXTURE AS BINDER

[76] Inventors: Galina Zakharovna Nefedova, ulitsa Shukhova, 5/7, kv. 15; Mark Alexandrovich Zhukov, ulitsa Kl.Tsetkin, 13, kv. 40; Arkady Borisovich Pashkov, Khoroshevskoe shosse, 74, korpus 3, kv. 56; Elena Isaakovna Ljustgarten, ulitsa Chkalova, 7, kv. 6; Larisa Dmitrievna Slabkaya, ulitsa Poltavskaya, 2/25, kv. 19; Nadezhda Petrovna Vasilieva, ulitsa Kl.Tsetkin, 31, kv. 213.; Gennady Grigorievich Arefev, ulitsa Moskvorechie, 78, kv. 56; Eduard Konstantinovich Savitsky, Vykhino, Samarkandsky bulvar, 24, korpus 1, kv. 91; Ljudmila Ivanovna Kostjukhina, Gospitalny val, 5, korpus 7, kv. 235; Sofya Abramovna Ostrovskaya, ulitsa Vorontsovskaya 30b, kv. 97; Valentina Grigorievna Belkovskaya, ulitsa Chernyshevskogo 38, kv. 3, all of Moscow, U.S.S.R.

[22] Filed: Feb. 28, 1974

[21] Appl. No.: 447,044

[52] U.S. Cl. ............................ 260/2.1 R; 260/2.2 R; 260/2.1 M; 75/101 BE
[51] Int. Cl.² ................ C08F 214/22; C08F 16/06; C08F 112/08
[58] Field of Search ........ 260/2.1 M, 2.2 R, 2.2 RL; 75/101 BE

[56] References Cited
UNITED STATES PATENTS

| | | | |
|---|---|---|---|
| 2,681,319 | 6/1956 | Bodamer | 260/2.1 |
| 2,681,320 | 6/1954 | Bodamer | 260/22 |
| 3,627,703 | 12/1971 | Kojima et al. | 260/2.1 E |
| 3,645,922 | 2/1972 | Weiss et al. | 260/2.1 R |
| 3,840,482 | 10/1974 | Bolta et al. | 260/2.1 R |
| 3,847,840 | 11/1974 | Kanig | 260/2.2 R |

OTHER PUBLICATIONS

"Ion Exchange" –Hefferlich–New York–1972–Wiley, pp. 63 & 64.

*Primary Examiner*—Joseph L. Schofer
*Assistant Examiner*—Peter F. Kulkosky

[57] ABSTRACT

A composite material for the preparation of a granulated ion exchanger comprising
 a. 75.0 to 6.0 wt % of ionite,
 b. 5.0 to 0.0 wt % of pore former,
 c. 20.0 to 40.0 wt % of thermoplastics used as a binding agent, wherein
 a. is a ionite of any kind,
 b. is selected from a group of neutral salts soluble in water,
 c. is selected from a group consisting of polythene, polypropylene, fluorine copolymers and a mixture of polythene with polyvinyl alcohol.

1 Claim, 1 Drawing Figure

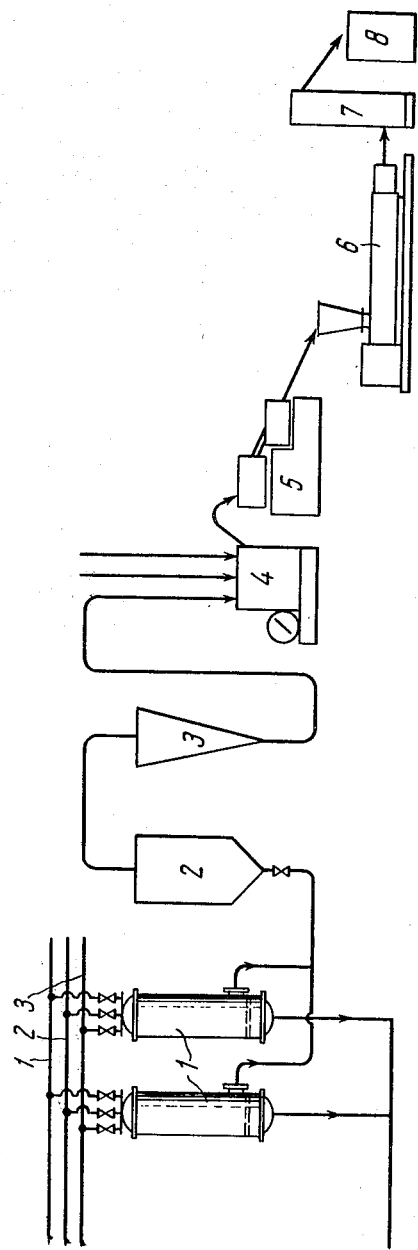

GRANULATED ION EXCHANGERS CONSISTING OF POLYSTYRENE EXCHANGERS WITH VINYLIDENE FLUORIDE COPOLYMER OR POLYTHENE-POLYVINYL ALCOHOL MIXTURE AS BINDER

The present invention relates to ion exchange materials, and more specifically to granulated ion exchangers.

The present invention may be used to advantage:

in hydrometallurgy as a means of recovering non-ferrous and rare metals, such as copper, nickel, cobalt, gold, etc;

in continuous ion exchange processes as those employed in the treatment of water for thermal power stations;

as catalysts in a variety of reactions of the organic synthesis;

in all those processes where the sorption of toxic or highly-valuable substances is involved, their loss with the disintegrated ion exchanger being intolerable.

There are known granulated ion exchangers of the gel structure which are products of polymerization or polycondensation e.g. polystyrene with ion exchange groups introduced into the polymer such as sulfuric or carboxylic resin. The known ion exchangers consist of such polymers here after termed ionite and a pore former, yet they exhibit low mechanical strength, inadequate osmotic stability and high polydispersion of the particles of ion exchanger, the structure of polymer matrix being the cause of said drawbacks.

An increase in the osmotic stability of granulated ion exchangers is obtainable by synthesizing styrene copolymer, which is a semi-finished ionite, in the presence of a solvent, e.g. heptane (USSR Inventor's Certificate No. 230,421). This synthesis yields ion exchangers of the macroporous structure displaying high osmotic stability.

After a 100-hour test in an apparatus under the conditions of recycling some 95 to 98 % of the granules remain intact whereas the number of intact granules of sulphonic cation exchanger of the gel structure, which is the strongest one, is only between 70 and 90 %.

A disadvantage of ion exchangers with macroporous structure is an excessive tensioning of the structure which results in impaired abrasive resistance and inability to obtain particles over 1.2 mm so that the use of these ion exchangers in hydrometallurgy is not acceptable for reasons of economy.

A slight increase in the strength of granulated ion exchangers has been obtained by introducing a fibrous filler during the process of polycondensation. Yet, the ion exchangers so produced exhibit low osmotic stability, and large granules, i.e., those over 1.5 mm, rapidly disintigrate during the processes of sorption, the number of intact granules being 85 to 90 % after a 100-hour test in an apparatus under the conditions of recycling.

It is an object of the present invention to provide granulated ion exchangers which combine satisfactory exchange capacity with high abrasive resistance.

Another object of the present invention is to provide granulated ion exchangers exhibiting high osmotic stability, i.e. resisting fracturing due to changes in the osmotic pressure over any range.

A further object of the present invention is to provide granulated ion exchangers which have a high mechanical strength.

Still a further object of the present invention is to provide granulated ion exchangers of uniform given granulometry which improves the conditions of flow during the processes of sorption.

In accordance with the above and other objects the essence of the present invention consists in the fact that in a granulated ion exchanger comprising an ionite and a pore former there is introduced according to the invention a thermoplastic serving as a binding agent, said components being taken in the following proportion:

thermoplastics, 20.0 to 40.0 wt %;
ionite, 75.0 to 60.0 wt %;
pore former, 5.0 to 0.0 wt %.

The thermoplastic bonds the particles of ionite to one another without disabling the ionogenic groups too much so that the ion exchanger increases its mechanical strength and osmotic stability, retaining an acceptably high exchange capacity at the same time. When used, the granulated ion exchanger disclosed offers such advantages as significantly lower losses of the sorbent and valuable or toxic products — the former resulting from abrading and the latter from the adsorbtion by fragments of the ionite —, improved flow characteristics of the processes of sorption and ease of separation of the sorbent from the pulp.

An important advantage of the ion exchanger disclosed is the possibility of utilizing ionites with non-standard granulometry which is a waste from the production of ion exchange resins.

It is advantageous that the granulated ion exchanger contains polythene as the binding agent, since polythene is a thermoplastic enjoying wide-spread application and lending itself readily to extrusion.

Further it is advantageous that the granulated ion exchanger contains fluorine copolymers as the binding agent, said copolymers lending themselves to extrusion and adding to the chemical stability of the ion exchanger which is a factor of importance when the medium is a strongly acid one as concentrated nitric acid by way of illustration.

It is preferable that the granulated ion exchanger contains polypropylene as the binding agent, for polypropylene adds to the thermal stability of the ion exchanger and renders it suitable for sorption processes at elevated temperature and for catalytic processes.

It is also preferred that the granulated ion exchanger contains polythene mixed with polyvinyl alcohol in a proportion 10:1, respectively, as the binding agent. The addition of polyvinyl alcohol makes the binding agent more hydrophylic and improves the kinetics of the ion exchanger which are factors essential, for instance, in the treatment of water for thermal power stations.

The technique of preparing the granulated ion exchanger according to the invention is preferably as follows and is explained in the accompaying drawing which is a flowsheet of the process for the preparation of the granulated ion exchanger according to the invention.

Referring to FIG. 1, an ionite of any kind, say strongly acid sulphonic cation exchanger, is separated from organic admixtures with low molecular weight and other impurities in a column 1 where the ionite is also transformed into a thermally stable salt by being treated with 5% solution of NaOH and then is washed with demineralized water until the reaction is neutral. On passing through a fluidized bed drier 2, where the moisture content is lowered to 5% maximum, the dry ionite is fed into a grinder 3 for reducing in size to particles between 20 and 100 microns. At the next stage, the dry and ground ionite, a thermoplastic capable of being extruded at a temperature not over 250°C (no special pretreatment of the plastics is required), a pore former selected from a group of neutral salts and additives in the form, for example, of calcium stearate are fed in given proportion from a metering hopper 4 into a continuous paddle mixer 5 where mixing takes place until a composition with a high degree of homogeneity is obtained.

The composition comprising the ionite, thermoplastic and additives, on being thoroughly prepared, is loaded into a hopper 6 of an extruder which takes care of such operations as compounding the ionite with the thermoplastic, plasticising the mixture at the temperature of forming and forcing the material through dies (not shown). The product is cut into granules of controlled length by means of a two-bladed cutter (not shown). The granules are transported by a flow of air to a jigging conveyor 7 where cooling in a stream of air takes place before the granules reach a collecting hopper 8.

The invention will be better understood from the following examples illustrating ways of preparing granulated ion exchangers.

EXAMPLE I

Strongly acid sulphonic cation exchanger with static exchange capacity of 5.1 mg eg/g in 0.1 N solution of NaOH and 4.9 mg eq/g in 0.1 N solution of $CaCl_2$, predried and ground to a particle size of 20 microns, was taken in an amount of 6700 g and mixed with 3300 g of low-pressure polythene in particulate form with a flow melt index of 5 g/10 min and 8 g of calcium stearate in the paddle mixer 5 for 45 min. The compound so obtained was extruded and granulated, the temperature of the barrel being between 160 and 180°C and that of the die between 180° and 200°C. The granules were given a cylindrical shape with a diameter of 1.0 to 3.0 mm and a length of 1.0 to 5.0 mm. The static exchange capacity was 3.2 mg eq/g in 0.1 N solution of NaOH and 3.0 mg eq/g in 0.1 N solution of $CaCl_2$. The volume per unit weight in swollen condition was between 2.4 and 2.8 ml/g. The mechanical strength after a 100-hour test in a ball mill was 100 %. The number of intact granules after a 100-hour test in an apparatus under the conditions of recycling was 100 % or at least 98 %.

The granulated ion exchanger according to the invention is intended for use in hydrometallurgy as a means of recovering non-ferrous and rare metals by sorption processes. Another outlet is in the production of monomers of synthetic rubber where the ion exchanger is used as a catalyst.

EXAMPLE 2

Weakly acid carboxylic cation exchanger with static exchange capacity of 8.6 mg eq/g in 0.1 N solution of NaOH, predried and ground to a particle size between 20 and 40 microns, was taken in an amount of 6500 g and mixed with 3500 g of low-pressure polythene with a flow melt index of 5 g/10 min, 325 g of calcium chloride and 25 g of calcium stearate in a paddle mixer for 45 min. The compound so obtained was extruded and granulated, the temperature of the barrel being 160° to 180°C and that of the die between 180° and 200°C. The granules were cylinders with a diameter of 1.0 to 3.0 mm and a length of 1.0 to 4.0 mm. The static exchange capacity was 6.0 mg eq/g in 0.1 N solution of NaOH and the volume per unit weight in swollen condition was between 2.8 and 3.0 ml/g. The mechanical strength after a 100-hour test in a ball mill was 100 %. The number of intact granules after a 100-hour test in an apparatus under the conditions of recycling was 100% or at least 98 %.

The granulated ion exchanger according to the invention is intended for use in hydrometallurgy as a means of recovering non-ferrous metals by sorption processes.

EXAMPLE 3

Medium acid cation exchanger with phosphoric functional groups and a static exchange capacity of 9.1 mg eq/g in 0.1 N solution of NaOH and 2.4 mg eq/g in 0.1 N solution of $CaCl_2$, predried and reduced in size to particles between 20 and 40 microns, was taken in an amount of 6500 g and mixed with 3500 g of copolymer of hexafluorine propylene and vinylidene fluoride in a mixer for 45 min. The compound so obtained was extruded and granulated, the temperature of the barrel being 160° to 180°C and that of the die between 180° and 200°C. The granules were cylinders with a diameter of 1.0 to 3.0 mm and a length of 1.0 to 4.0 mm. The static exchange capacity was 5.0 mg eq/g in 0.1 N solution of NaOH and 1.0 mg eq/g in 0.1 N solution of $CaCl_2$. The volume per unit weight in swollen condition was 2.4 to 2.8 ml/g. The mechanical strength after a 100-hour test in a ball mill was 100 %. The number of intact granules after a 100-hour test in an apparatus under the conditions of recycling was 100 % or at least 98 %.

The granular ion exchanger according to the invention is intended for use in hydrometallurgy as a means of recovering heavy metals by sorption processes.

EXAMPLE 4

Amphoteric ionite with carboxylic and amino functional groups displaying a static exchange capacity of 7.2 mg eq/g referring to amino groups, 3.1 mg eq/g referring to carboxylic groups and 200 mg/g referring to copper with pH equal to 3.3 was, on drying and reducing in size to particles between 20 and 40 microns, taken in an amount of 6800 g and mixed with 3200 g of low-pressure polythene with a flow melt index of 5 g/10 min, 3.3 gr of calcium stearate and 0.32 g of bis(5-methyl-3-tertbutyl-2-oxyphenyl)-methane which is an antioxidant; the mixing being accomplished in a mixer for 45 min. The compound so obtained was extruded and granulated, the temperature of the barrel being 160° to 180°C and that of the die between 180° and 200°C. The granules were cylinders with a diameter of 1.0 to 3.0 mm and a length of 1.0 to 4.0 mm. The static exchange capacity was 4.8 mg eq/g referring to amino groups, 2.3 mg eq/q referring to carboxylic groups and 140 mg/g referring to copper with pH equal to 3.3. The volume per unit weight in swollen condition was 3.9 ml/g. The mechanical strength after a 100-hour test in a ball mill was 100 %. The number of intact granules after a 100-hour test in an apparatus under the conditions of recycling was 100 % or at least 98 %.

The granulated ion exchanger according to the invention is intended for use in hydrometalurgy as a means of recovering non-ferrous metals by sorption processes.

EXAMPLE 5

Phosphoric cation exchanger with a static exchange capacity of 9.1 mg eq/g in 0.1 N solution of NaOH and 2.4 mg eq/g in 0.1 N solution of $CaCl_2$, predried and reduced in size to particles between 20 and 40 microns, was taken in an amount of 6500 g and mixed with 3500 g of polypropylene with a flow melt index of 5 g/10 min and 175 g of a surfactant of the noniogenic kind comprising a mixture of oxyethylated alkyl phenols resulting from the treatment of 1 mole of alkyl phenol with 7 moles of ethylene oxide, the mixing being accomplished in a mixer during a period lasting 45 min. The compound so obtained was extruded and granulated, the temperature of the barrel being 180° to 200°C and that of the die 200°C. The granules were cylinders with a diameter of 1.0 to 3.0 mm and a length of 1.0 to 4.0 mm. The static exchange capacity was 5.0 mg eq/g in 0.1 N solution of NaOH and 1.0 mg eq/g in 0.1 N solution of $CaCl_2$. The volume per unit weight in swollen condition was 2.4 to 2.7 ml/g. The mechanical strength after a 100-hour test in a ball mill was 100 %. The number of intact granules after a 100-hour test in an apparatus under the conditions of recycling was 100 % or at least 98%.

The granulated ion exchanger according to the invention is intended for use in hydrometallurgy as a means of recovering metal by sorption processes.

EXAMPLE 6

Strongly basic anion exchanger with $N^+/CH_3/_3$ ... $Cl^-$ functional groups and a static exchange capacity of 3.6 mg eq/g in 0.1 N solution of HCl and 3.2 mg eq/g in 0.1 N solution of NaCl, predried and reduced in size to particles between 20 and 40 microns, was taken in an amount of 6700 g and mixed with 3000 g of low-pressure polythene with a flow melt index of 5 g/10 min, 300 g of polyvinyl alcohol and 33 g of glycerin in a mixer for 45 min. The compound so obtain was extruded and granulated, the temperature of the barrel being 160° to 170°C and that of the die 180°C. The granules were cylinders with a diameter of 1.0 to 3.0 mm and a length of 1.0 to 4.0 mm. The static exchange capacity was 2.8 mg eq/g in 0.1 N solution of HCl and 2.6 mg eq/g in 0.1 N solution of NaCl. The volume per unit weight in swolled condition was between 2.2 and 2.8 ml/g. The mechanical strength after a 100-hour test in a ball mill was 100 %. The number of intact granules after a 100-hour test in an apparatus under the conditions of recycling was 100 % or at least 98 %.

The ion exchanger according to the invention is intended for use in hydrometallurgy as a means of recovering product by sorption processes.

What is claimed is:

1. An ion-exchanger of uniform granulometry obtained by extruding a mixture and then granulating the obtained extrudate, said mixture comprising, by weight, a ground mixture of 60 to 75% of polystyrene containing ion exchange groups, up to 5% of calcium chloride as a pore former and 20 to 40% of a binding agent selected from the group consisting of polythene and polyvinyl alcohol in a proportion of 10:1 by weight and a copolymer of hexafluorine propylene and vinylidene fluoride taken in a proportion of 6:1.

* * * * *